United States Patent
Radice

(10) Patent No.: US 6,795,112 B1
(45) Date of Patent: Sep. 21, 2004

(54) COMPOSITE VIDEO MULTIPLEXING SCHEME

(75) Inventor: Anthony M. Radice, Riverside, NJ (US)

(73) Assignee: General Instrument Corp., Horsham, PA (US)

( * ) Notice: Subject to any disclaimer, the term of this patent is extended or adjusted under 35 U.S.C. 154(b) by 1038 days.

(21) Appl. No.: 09/039,111

(22) Filed: Mar. 13, 1998

(51) Int. Cl.[7] ................................................. H04N 7/18
(52) U.S. Cl. ........................................................ 348/159
(58) Field of Search ................................. 348/385, 386, 348/387, 159

(56) References Cited

U.S. PATENT DOCUMENTS

| | | | | |
|---|---|---|---|---|
| 3,745,242 A | * | 7/1973 | Justice | 348/385 |
| 4,679,077 A | * | 7/1987 | Yuasa et al. | 348/154 |
| 5,138,440 A | * | 8/1992 | Radice | 348/472 |

\* cited by examiner

*Primary Examiner*—David Bayless

(57) ABSTRACT

A composite video multiplexing arrangement for allowing a plurality of low bit rate video signals to be multiplexed into a single coded signal to be transmitted to an associated receiver. For use with arrangements such a security system, each video "source" (such as a camera) includes a coder module for forming a digital representation of the video, including both "source" and "line" information. Each coder module includes a FIFO buffer for holding this data until multiplexed onto the single output signal. An associated decoder is capable of extracting the "source" and "line" information and regenerating each separate video signal.

10 Claims, 2 Drawing Sheets

COMPOSITE VIDEO MULTIPLEXING SCHEME

BACKGROUND OF THE INVENTION

1. Technical Field

The present invention relates to a composite video multiplexing scheme and, more particularly, to a scheme for allowing multiple low bit rate video signals to be multiplexed into a single coded signal.

2. Prior Art

There are many instances where a number of separate video signals are to be transmitted to a single location. For example, security systems often use a number of cameras that all transmit their signals to a single monitor. A conventional monitor may function by "scanning" through each video, spending only a few seconds viewing each scene in sequence. As a result, there is a significant time lapse between sequential viewings of any particular scene. That is, if there are six sources and each is viewed for five seconds, there will be at least a 30 second time lapse (in the ideal case) between sequential viewings of any particular scene. Such a delay is unacceptable in many situations, particularly in security monitoring. Another technique utilizes a "split screen", such as "quadrant" viewing, where a number of separate scenes are simultaneously viewed. Although quadrant viewing solves the time lapse problem mentioned above, significant detail may be lost, since only one-fourth of the screen is dedicated to each scene. Additionally, such "split" screen viewing is limited in that, for most practical situations, no more than four screens can be realistically viewed at a time.

SUMMARY OF THE INVENTION

The need remaining in the prior art is addressed by the present invention, which relates to a composite video multiplexing scheme and, more particularly, to a scheme for allowing for multiple low bit rate video signals to be multiplexed into a single coded composite video signal.

In accordance with the teachings of the present invention, a coder module is associated with each source (camera) and provides a digital output signal, where each line of digital data includes both a source identifier and a "line" identifier for the video scene. This data is stored in a "first-in-first-out" (FIFO) buffer at the source. A multiplexer is coupled to the plurality of FIFO buffers and functions to sequentially read from each FIFO buffer and form a multiplexed digital signal. The digital signal is then transformed into an analog output signal, where the output signal thus a comprises a composite of the separate video sources. A decoder at the termination of the system performs a analog-to-digital conversion and then reads the "source" and "line" information and functions to "sort" the received information. The sorted signals are then reconstructed into the separate video images.

The composite transmission system of the present invention is suitable for use with any low information rate signals (electronic billboards, communication notices, weather information, etc.).

Various other features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
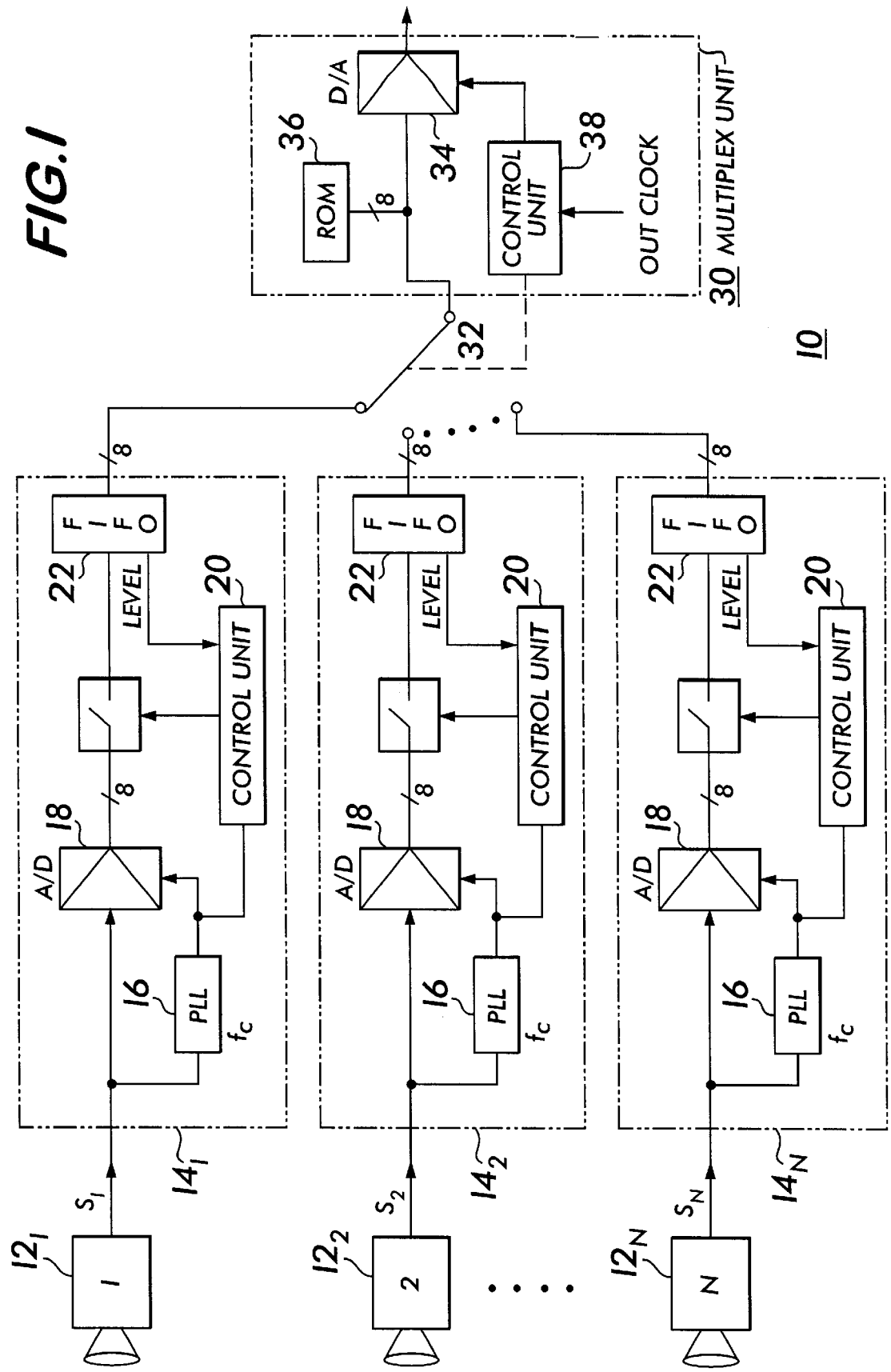
FIG. 1 illustrates an exemplary composite video coder formed in accordance with the present invention.

An exemplary composite video coder 10 formed in accordance with the present invention is illustrated in FIG. 1. Composite video coder 10 functions to analyze video signals recorded by N different sources, represented by N cameras $12_1, 12_2, \ldots 12_N$ in FIG. 1. Each camera 12 may form part of a monitor for a security system and is used to generate a conventional analog video output signal, denoted $S_1, S_2, \ldots S_N$, respectively. Each source $12_i$ has an associated coder module $14_i$, disposed as shown in FIG. 1, with coder module $14_1$ coupled to received analog video signal $S_1$ from source $12_1$, coder module $14_2$ for receiving analog video signal $S_2$ from source $12_2$, and so on, with signal $S_N$ from source $12_N$ applied as an input to coder module $14_N$. Only a single coder module 14 will be discussed in detail below. It is to be understood that each coder module comprises similar components and functions in a similar manner.

An exemplary coder module 14 includes a phase-locked loop 16 that functions to extract the frequency of the color subcarrier associated with the input analog video signal S. The extracted subcarrier frequency $f_{SC}$ is used as the sampling rate for an analog-to-digital (A/D) converter 18, where the analog video signal S is applied as an input to A/D converter 18. The subcarrier frequency $f_{SC}$ is also applied as an input to a control unit 20. Control unit 20 is used to supply the source and line information to the digitized source information generated by A/D converter 18. For example, control unit 20 of coder module $14_1$ will insert "source 1", and the appropriate line number (for example, 32) as the preamble for the current digital signal. Once this information is inserted, the digitized data is stored in a first-in-first-out (FIFO) buffer 22.

Figure 2:
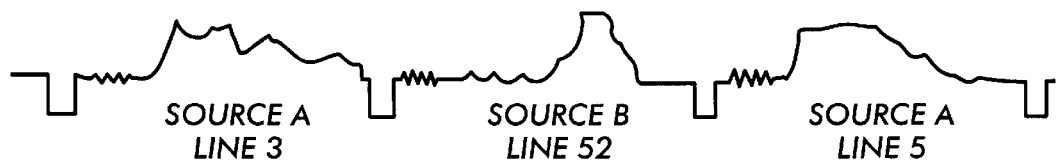
FIG. 2 is a diagram of an exemplary composite video signal.

System 10 also includes a multiplex unit 30 that functions to sequentially read the data stored in each FIFO buffer $22_1$–$22_N$ and form the composite video output C from this stored information. In particular, multiplex unit 30 includes a clocked switch 32 that sequentially interrogates each FIFO buffer $22_1$–$22_N$ and extracts the "oldest" line of information stored in each buffer. One of the "n" lines is selected to be fed to the output of the D/A converter 34. All of the remaining n−1 lines of data from the respective input buffers are discarded. The respective source is chose by the circuitry within multiplex unit 30. The clock rate for this operation, defined as OUTCLK, is independent of the various PLL clocks $f_{SC}$ associated with PLLs $16_1$–$16_N$. These digitized streams are subsequently applied as an input to a digital-to-analog (D/A) converter 34, which forms the composite analog output video signal C. FIG. 2 illustrates an exemplary composite video signal C.

Figure 3:
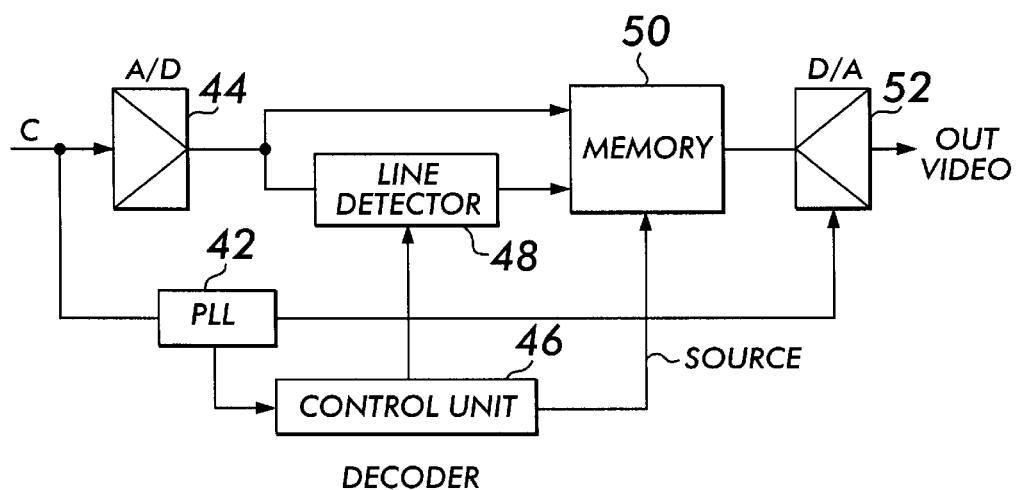
FIG. 3 illustrates an exemplary decoder for use with the composite video coder of FIG. 1.

An exemplary decoder 40 for receiving the composite video signal C and reconstructing the separate video signals is illustrated in FIG. 3. As shown, the composite video signal C is applied as an input to a phase-locked loop 42 and an A/D converter 44. PLL 42 functions to extract the incoming color burst (OUTCLK) and use this rate to clock A/D converter 44. A control unit 46 extracts the "source" information and a line detector 48 extracts the "line" information. The "source" and "line" identifiers are then used to place each incoming portion of video information into its proper location within a memory 50. Control unit 46 places each line of incoming data in memory 50 with respect to its line identifier, in the correct location relative to its identified source. Video regenerator unit 52 then merely reads the memory and reconstructs the video signal.

The composite processing scheme described in general above will now be described in more detail in association with a two source system. It is to be understood that any desired number of sources may be multiplexed to form the composite signal of the present invention, the use of two sources is intended to be exemplary only and somewhat simplifies the illustration.

Figure 4:
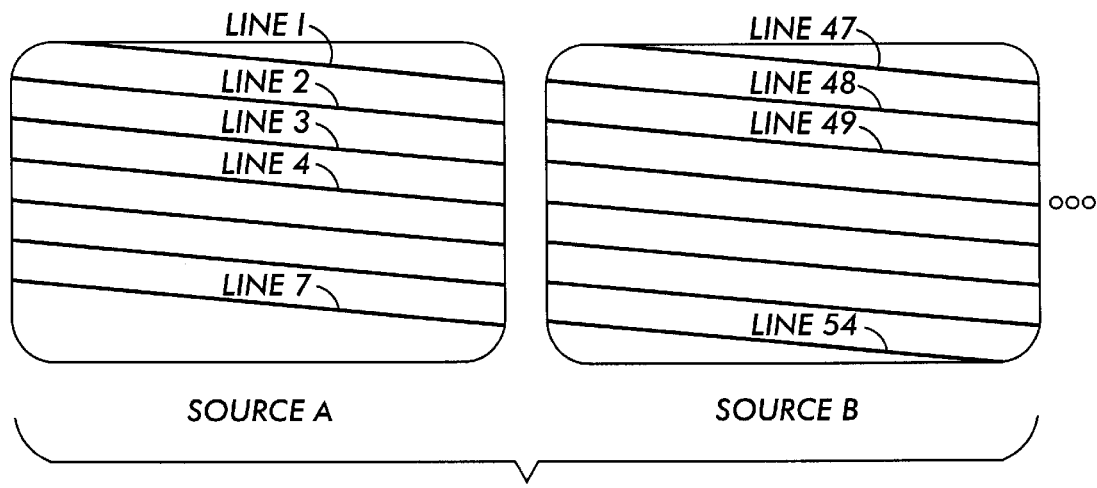
FIG. 4 illustrates a particular example of the composite video scheme for use with a pair of sources.

FIG. 4 contains current video signals associated with a first source A and a second source B. Utilizing the coding system of FIG. 1, a first FIFO $22_A$ would store sequential lines from source A and a second FIFO $22_B$ would store sequential lines from source B. A first sweep through would form the following composite signal: A2, B47, A4, B49, A6, B51, . . . . The next transmitted frame would comprise the following lines: A3, B48, A5, B50, . . . . At the received end, the information would be sorted by "source" and stored in either memory partition A or memory partition B, as appropriate. Although the information is written in the order in which it is received, it will be read sequentially so that the proper video signal may be reconstructed. As a result, the output video cannot be reconstructed until two frames of information have been received. In general, when using N sources, N frames need to be received before the output video may be reconstructed. The resultant "flicker rate" for NTSC at 30 frames/second will be 30/N.

An advantage of the composite scheme of the present invention is that the receiver may be configured to determine if a "significant change" has taken place at the source associated with the "just received" data. For example, in a security system, certain scenes may remain static for long periods of time. In that case, the received data associated with that scene will be essentially identical to the previously-received data for the scene and the new data need not be stored in memory. A "read before write" operation can be used in accordance with the present invention to compare newly-received video data to the "old" line information stored in the appropriate memory location. A predetermined threshold (adjustable and may be set by the user) is used to compare the new data with the old and determine if a "significant change" has occurred. If a determination is made that such a change has occurred, the new data is stored in the memory, replacing the old data. Also, this information may be used to control the particular scene being viewed by the receiver's monitor. That is, if a "significant change" in data occurred, the "source" information associated with this change may be sent to the monitor and the monitor commanded to view this scene.

Various other modifications may be made to the system as described above and are considered to fall within the spirit and scope of the present invention. For example, there may be systems where there is no need to form an analog signal and all processing occurs strictly in the digital domain.

What is claimed is:

1. A coder for forming a composite video signal from a plurality of N separate video sources, the coder comprising
   a plurality of N coder modules, each module associated with a separate video source for recording video information and forming a digital representation thereof, each coder module including control means for inserting source and line information into each digital line representation; and
   a video multiplexer for sequentially multiplexing the digital representations formed by the plurality of N coder modules to form a composite video output signal.

2. A coder as defined in claim 1 wherein each coder module comprises
   a phase-locked-loop for receiving the recorded video information and extracting the color subcarrier rate therefrom;
   an analog-to-digital converter for receiving the recorded video information and generating as an output a digital representation thereof, the digital output rate controlled by the color subcarrier rate extracted by the phase-locked-loop;
   control means for inserting source and line identification data into the digital output signal formed by the analog-to-digital converter; and
   a first-in-first-out buffer for storing, on a line-by-line basis, the digital output signal, including the inserted source and line information.

3. A coder as defined in claim 2 wherein each first-in-first-out buffer is constrained to accept complete line information, ignoring any information that fills less than a complete line of data.

4. A coder as defined in claim 2 wherein the video multiplexer comprises
   a clocked switch for sequentially interrogating each first-in-first-out buffer and inserting each retrieved line of digital data onto a single output line; and
   a digital-to-analog converter for transforming the multiplexed digital data into a composite analog video output signal.

5. A coder as defined in claim 4 wherein the clocked switch will skip over any first-in-first-out buffer that has no data stored therein and proceed to another first-in-first-out buffer.

6. A decoder for extracting video information related to a plurality of N separate sources from a composite video signal, the decoder comprising
   a phase-locked-loop for extracting the color burst rate from the received composite video signal;
   an analog-to-digital converter, controlled by the extracted color burst rate for generating a digital output stream from the received composite video signal;
   control means for analyzing each segment of the digital signal and extracting therefrom the source and line information;
   memory means, partitioned into separate segments, each associated with a separate source, for storing the digital signal in the appropriate partitioned source and line location; and
   extraction means for interrogating the memory means and retrieving therefrom the digital data associated with a predetermined source; and
   a digital-to-analog converter for transforming the retrieved digital data into an analog representation that may be viewed on an associated video monitor.

7. A decoder as defined in claim 6 wherein the control means further comprises a comparing means for comparing received digital data to previously received data associated with that source and line.

8. A decoder as defined in claim 7 wherein the control means permits the newly received data to be stored in memory only if there exists a predetermined difference between the newly received data and the previously received data.

9. A composite video system comprising a coder for forming a composite video signal from a plurality of N separate video sources, the coder comprising a plurality of N coder modules, each module associated with a separate video source for recording video information and forming a digital representation thereof, each coder module including control means for inserting source and line information into each digital line representation; and a video multiplexer for sequentially multiplexing the digital representations formed by the plurality of N coder modules to form a composite video output signal; and a decoder for extracting video information related to a plurality of N separate sources from a composite video signal, the decoder comprising a phase-locked-loop for extracting the color burst rate from the received composite video signal;

an analog-to-digital converter, controlled by the extracted color burst rate for generating a digital output stream from the received composite video signal;

control means for analyzing each segment of the digital signal and extracting therefrom the source and line information;

memory means, partitioned into separate segments associated with each source, for storing the digital signal in the appropriate partitioned source and line location; and extraction means for interrogating the memory means and retrieving therefrom the digital data associated with a predetermined source; and a digital-to-analog converter for transforming the retrieved digital data into an analog representation that may be viewed on an associated video monitor.

10. A composite video coding scheme as defined in claim 9 wherein each coder module comprises a phase-locked-loop for receiving the recorded video information and extracting the color subcarrier rate therefrom;

an analog-to-digital converter for receiving the recorded video information and generating as an output a digital representation thereof, the digital output rate controlled by the color subcarrier rate extracted by the phase-locked-loop;

control means for inserting source and line identification data into the digital output signal formed by the analog-to-digital converter; and a first-in-first-out buffer for storing, on a line-by-line basis, the digital output signal, including the inserted source and line information.

* * * * *